(12) United States Patent
Sugita et al.

(10) Patent No.: US 6,949,846 B2
(45) Date of Patent: Sep. 27, 2005

(54) LINEAR MOTOR WITH REDUCED COGGING FORCE

(75) Inventors: Satoshi Sugita, Nagano (JP); Yasushi Misawa, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 10/925,507

(22) Filed: Aug. 25, 2004

(65) Prior Publication Data

US 2005/0046281 A1 Mar. 3, 2005

(30) Foreign Application Priority Data

Aug. 29, 2003 (JP) ......................................... 2003-307788

(51) Int. Cl.[7] .............................................. H02K 41/00
(52) U.S. Cl. ........................................................ 310/12
(58) Field of Search ............................. 310/12, 13, 15, 310/216

(56) References Cited

U.S. PATENT DOCUMENTS

| 4,638,192 A | 1/1987 | von der Heide |
| 5,907,200 A | 5/1999 | Chitayat |
| 5,909,066 A | 6/1999 | Nanba et al. |
| 6,713,899 B1 * | 3/2004 | Greubel et al. ................ 310/12 |

* cited by examiner

Primary Examiner—Tran Nguyen
(74) Attorney, Agent, or Firm—Rankin, Hill, Porter & Clark LLP

(57) ABSTRACT

A linear motor in which the shape of magnetic pole surfaces of pole teeth located at both ends of a plurality of pole teeth can be easily formed to be suitable for reducing cogging force. Each of magnetic pole surfaces 19a of pole teeth 15A located at both ends of a plurality of pole teeth 15 is constituted by an arc-shaped curved surface that is curved so that a gap from a stator 1 increases with increasing distance from other adjacent pole tooth 15B. Through holes 23A and 23B that extend in the laminating direction of electromagnetic steel plates 10 are formed in the vicinity of the magnetic pole surfaces 19a of the pole teeth 15A. Inside the through holes 23A and 23B, magnetic pieces, which are shorter than the thickness of the electromagnetic steel plates in their laminating direction, are arranged so as to leave spaces at both ends of the through holes 23A and 23B.

5 Claims, 2 Drawing Sheets

LINEAR MOTOR WITH REDUCED COGGING FORCE

BACKGROUND OF THE INVENTION

The present invention relates to a linear motor.

As an example of a linear motor in which a movable element reciprocates linearly relative to a stator, the linear motor has an armature and at least one row of magnetic poles formed by juxtaposedly arranging a plurality of permanent magnets. The armature has a core which is constituted by laminating a plurality of electromagnetic steel plates and exciting windings. The core has a yoke that extends linearly in a direction orthogonal to the direction in which the electromagnetic steel plates are laminated, and a plurality of pole teeth that protrude from the yoke toward the magnetic pole row side and have magnetic pole surfaces opposed to the row of magnetic poles or magnetic pole row at their ends. A plurality of the exciting windings excite the pole teeth. In the linear motor of this type, however, large cogging force is generated. Thus, in order to solve this problem, there has been proposed a linear motor in which a processed metal plate was mounted so as to cover the core, as shown in FIG. 7 of U.S. Pat. No. 4,638,192. This processed metal plate has portions that protrude from both ends of the core in the reciprocating direction of the movable element. Each of these protruding portions has an arc-like curved surface so that a gap between the row of magnetic poles or magnetic pole row increases with increasing distance from the respective adjacent pole tooth.

However, in this linear motor, the metal plate is processed to form the arc-like curved surfaces. Thus, it was difficult to form the optimum arc shape for reducing the cogging force. Further, since the processed metal plate is employed, eddy current loss increases. Still further, the curved surfaces tend to deform due to an external force. For these reasons, variations in the quality of the linear motor were apt to occur.

SUMMARY OF THE INVENTION

An object of the present invention is therefore to provide a linear motor in which it is easy to shape the magnetic pole surfaces of the pole teeth at both ends of a pole tooth row (16) constituted by a plurality of pole teeth so as to be suitable for reducing cogging force.

Another object of the present invention is to provide a linear motor in which even if the curved magnetic pole surfaces located at both ends of a pole tooth row constituted by a plurality of pole teeth have the same width dimension, the curved magnetic pole surfaces have a magnetic resistance pattern desirable for magnetically reducing the cogging force.

Still another object of the present invention is to provide a linear motor that can reduce eddy current loss.

A further object of the present invention is to provide a linear motor of which quality variations can be reduced.

A linear motor of which the present invention aims at improvement has a stator and a movable element constructed to reciprocate linearly relative to the stator. The linear motor according to the present invention comprises a row of magnetic poles or magnetic pole row and an armature. The magnetic pole row is provided at one of the stator and movable element, and is constituted by juxtaposedly arranging permanent magnets. The armature is provided at the other of the stator and movable element, and has a core formed by lamination of a plurality of electromagnetic steel plates and multi-phase exciting windings. The core has a yoke extending linearly in a direction orthogonal to a direction in which the electromagnetic steel plates are laminated, and a plurality of pole teeth protruding from the yoke toward the magnetic pole row side and having magnetic pole surfaces opposed to the magnetic pole row at ends thereof. The multi-phase exciting windings excite the pole teeth. Each of the magnetic pole surfaces of the pole teeth respectively located at both ends of the magnetic pole row constituted by a plurality of the pole teeth is composed of a curved surface which is curved so that a gap between the magnetic pole row and the curved surface increases with increasing distance from other pole tooth adjacent thereto. Thus in the present invention, the magnetic pole surfaces, which become the curved surfaces of the pole teeth located at both ends of the magnetic pole row constituted by a plurality of the pole teeth, are formed by the laminated surfaces of the laminated electromagnetic steel plates. Accordingly, by determining the shape of the electromagnetic steel plates appropriately, the magnetic pole surfaces at both ends of a plurality of the pole teeth can be easily formed into a shape optimal for reducing cogging force. Further, according to the present invention, the curved surfaces are formed using the laminated electromagnetic steel plates, thereby reducing eddy current loss. Still further, unlike a single processed metal plate used in the prior art, the curved surfaces formed of the laminated electromagnetic steel plates are difficult to deform even if an external force is applied to the curved surfaces. Variations in the quality of the linear motor thus can be reduced.

When each of the curved surfaces has the contour of an arc as seen from one side in the laminating direction of the electromagnetic steel plates, the curved surfaces are defined as follows: it is preferable that the arc is so defined as to satisfy a relationship of $1 \leq R/\tau p \leq 3.5$, where R is a radius of the arc, and $\tau p$ is a pitch between the centers of two adjacent permanent magnets included in the magnetic pole row. By defining the radius R of the arc as described above, the curved surfaces that can reduce the cogging force can be obtained by simple design. When the ratio $R/\tau p$ becomes less than one, the cogging force cannot be reduced, and a variation in the cogging force becomes larger. When the ratio $R/\tau p$ exceeds 3.5, the total length of the armature increases, and the mass of the armature also increases.

It is preferable that the curved surfaces are so formed to satisfy a relationship of $0.38 \leq Lt/R \leq 0.65$, where Lt is a length between a lower end of the curved surface, and an intersection of a virtual line passing through the lower end of the curved surface and extending in parallel to the magnetic pole row and a virtual perpendicular passing through an upper end of the curved surface and orthogonally crossing the virtual line (Lt is the shortest distance between a perpendicular passing through the lower end and a perpendicular passing through the upper end) and R is a radius of the arc. If the curved surfaces are formed as described above, the cogging force can be reduced, and a variation in the cogging force can also be reduced even if the mounting accuracy of the armature is not increased. When the ratio Lt/R becomes less than 0.38, the cogging force cannot be reduced. When the ratio Lt/R exceeds 0.65, the total length of the armature increases, and the mass of the armature also increases.

It is preferable that an angle $\alpha°$ between a virtual line that extends in parallel to the magnetic pole row and a tangent that passes through the lower end of the curved surface satisfies a relationship of $0° \leq \alpha° \leq 10°$. If the angle $\alpha°$ is set as described above, the cogging force can be reduced and a variation in the cogging force can also be reduced even if the positioning accuracy of permanent magnet arrangement is not increased. When the angle α° exceeds 10°, the cogging force cannot be reduced, and a variation in the cogging force becomes larger.

In a vicinity of the magnetic pole surface of each of two pole teeth located at both ends of the pole tooth row, one or more holes or cavities extending in the laminating direction of the electromagnetic steel plates can be formed. The holes or cavities may be through holes, closed-end holes, or cavities. By defining the positions and the number of the holes or cavities appropriately, magnetic resistance inside each of the pole teeth can be changed, and the magnetic characteristic on the side of the pole teeth can be modified to reduce the cogging force, even if the size of a gap formed between each curved surface and the magnetic pole row remains the same.

Magnetic pieces having a length shorter than the thickness of the electromagnetic steel plates in their laminating direction can be arranged in one or more of the holes or cavities. With this arrangement, inside the pole teeth, the magnetic resistance in the portions where the magnetic pieces are present becomes smaller than the magnetic resistance in the portions where the holes or the cavities are left. As a result, by changing the inserting positions of the magnetic pieces appropriately, the magnetic characteristic of a magnetic path inside the pole tooth can be changed. By insertion of the magnetic pieces, the magnetic characteristic similar to the one obtained with the shape of the pole tooth that is tapered in width toward a magnetic end, or with increasing distance from the yoke in the extending direction of the yoke, for example, can be obtained without changing the actual outer shape of the pole tooth. This magnetic characteristic can be obtained by arranging the magnetic pieces in such positions as to leave spaces at both ends of one or more holes or cavities. If this magnetic characteristic is obtained, the cogging force generated at both ends of the pole teeth can be further reduced. This magnetic characteristic can be arbitrarily changed, according to the number of the holes or cavities and the lengths and positions of the magnetic pieces.

Preferably, a plurality of the holes or cavities are juxtaposedly formed along the magnetic pole surfaces, and the lengths of the magnetic pieces inserted into the holes or cavities are decreasing toward the upper end of the magnetic surface or with increasing distance from the magnetic pole row. With this arrangement, the magnetic characteristic similar to the one obtained with the shape of the pole tooth that is tapered in width toward the magnetic end, or with increasing distance from the yoke in the extending direction of the yoke, can be obtained without changing the actual outer shape of the pole tooth. Thus, the cogging force can be further reduced.

According to the present invention, the curved surfaces optimal for reducing the cogging force can be easily formed. Further, it is possible to reduce eddy current loss at two pole teeth respectively located at both ends of a plurality of the pole teeth. In addition, deformation of the curved surfaces of the pole teeth at both ends can be prevented, and a variation in the quality of the linear motor can be reduced. Still further, according to the present invention, by forming the holes or cavities at both ends of the pole teeth or inserting the magnetic pieces into these holes or cavities, the magnetic characteristic at both ends of the pole teeth can be changed, without changing the shape of the magnetic pole surfaces. Thus, the pole teeth having the magnetic characteristic suitable for reducing the cogging force can be easily formed.

BRIEF DESCRIPTION OF THE DRAWINGS

These and other objects and many of the attendant advantages of the present invention will be readily appreciated as the same becomes better understood by reference to the following detailed description when considered in connection with the accompanying drawings.

DETAILED DESCRIPTION OF PREFERRED EMBODIMENTS

Figure 1:
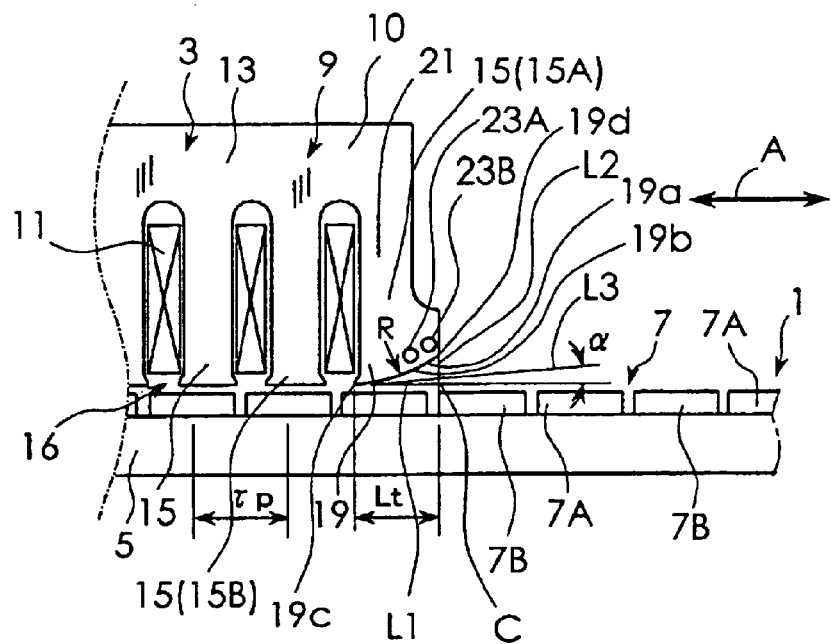
FIG. 1 is a schematic diagram used to explain the construction of a linear motor according to the best mode of implementing the present invention.

The best mode for carrying out the present invention will be described with reference to the appended drawings. FIG. 1 is a schematic diagram used to explain the construction of a linear motor according to a first embodiment of the present invention. FIG. 1 shows part of a stator 1 and part of a movable element 3. As shown in FIG. 1, the linear motor according to this embodiment includes the stator 1 and the movable element 3. The stator 1 has a structure provided with a magnetic pole row 7 on a base 5. The magnetic pole row 7 is constituted by alternately arranging a plurality of N-pole permanent magnets 7A and a plurality of S-pole permanent magnets 7B.

The movable element 3 is movably supported by supporting means not shown, relative to the stator 1. The movable element 3 includes an armature constituted by a core 9 and multi-phase exciting windings 11 as shown in a perspective view of FIG. 2. The core 9 is constituted by laminating a plurality of electromagnetic steel plates 10. The core 9 includes a yoke 13 that extends linearly in a direction orthogonal to the direction in which the electromagnetic steel plates 10 are laminated and a plurality of pole teeth 15 that protrude from the yoke 13 toward the magnetic pole row 7 side. Part of each of the exciting windings 11 is arranged in each of slots 17 formed between an adjacent pair of the pole teeth 15. With this arrangement, the pole teeth 15 are excited by the exciting windings 11, and the movable element 3 reciprocates in the direction in which the permanent magnets 7A and the permanent magnets 7B are arranged, which is a direction indicated by an arrow A shown in FIG. 1.

Figure 2:
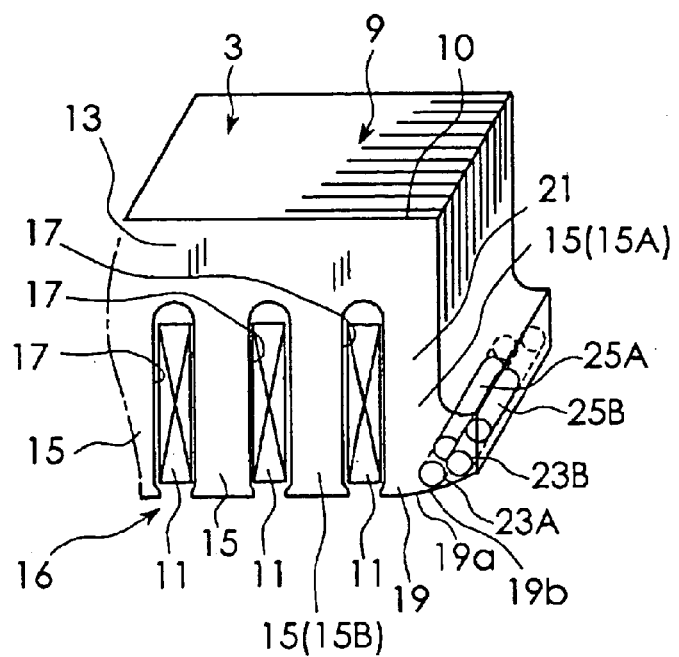
FIG. 2 is a partial perspective view of a movable element used in the linear motor shown in FIG. 1.

Each of the pole teeth 15A respectively located at both ends of the pole tooth row 16 constituted by the pole teeth 15 includes a magnetic pole surface constituent section 19 opposed to the stator 1 and a coupling section 21 for coupling the magnetic pole surface constituent section 19 to the yoke 13. In FIGS. 1 and 2, only one of the pole teeth 15A located at both ends of the pole tooth row 16 is shown. The thickness of the magnetic pole constituent section 19 in the reciprocating direction of the movable element 3, indicated by the arrow A, is so formed as to be larger than the thickness of the coupling section 21. For this reason, part of the magnetic pole constituent section 19 protrudes from the coupling section 21 in the outward direction of the core 9. The magnet pole surface constituent section 19 includes a magnetic pole surface 19a opposed to the magnetic pole row 7, at its end. The magnetic pole surface 19a is constituted by a curved surface 19b that is so curved that a gap between the magnetic pole row 7 and the curved surface increases with increasing distance from other adjacent pole tooth 15B. The contour of the curved surface 19b has the shape of an arc as seen from one side of the direction in which the electromagnetic steel plates 10 are laminated. As shown in FIG. 1, a radius R of the arc is defined to satisfy a relationship of $1 \leq R/\tau p \leq 3.5$, where $\tau p$ is a pitch between the centers of two of the permanent magnets 7A and 7B adjacent to each other in the magnetic pole row 7. The curved surface 19b is so formed as to satisfy a relationship of $0.38 \leq Lt/R \leq 0.65$, where Lt is a length between an intersection C of a virtual line L1 passing through the lower end 19c of the curved surface 19b and extending in parallel to the magnetic pole row and a virtual perpendicular L2 passing through upper end 19d of the curved surface 19b and orthogonally crossing the virtual line L1, and the lower end 19c of the curved surface. In other words, Lt is the shortest distance between a perpendicular passing through the upper end of the curved surface 19a and a perpendicular passing through the lower end of the curved surface 19a. Further, the curved surface 19b is so formed that an angle $\alpha°$ between a virtual line L1 that extends in parallel to the magnetic pole row 7 and a tangent L3 that passes through the lower end of the curved surface 19b satisfies a relationship of $0° \leq \alpha° \leq 10°$.

Holes or cavities are formed in a vicinity of the magnetic pole surface 19a of the magnet pole surface constituent section 19. The holes or cavities are constituted by two through holes 23A and 23B that extend in the direction in which the electromagnetic steel plates 10 are laminated. The through holes 23A and 23B have a circular cross-sectional shape, and are formed to be arranged along the magnetic pole surface 19a. Cylindrical magnetic pieces 25A and 25B that can be inserted into the through holes 23A and 23B are arranged inside the two through holes 23A and 23B, respectively. The magnetic pieces 25A and 25B are both composed of carbon steel or the like that has magnetic resistance slightly larger than that of the core 9. The magnetic pieces 25A and 25B both have a length shorter than the thickness of the electromagnetic steel plates 10 in their laminating direction, and the magnetic pieces 25A and 25B are arranged in the centers of the through holes 23A and 23B so that spaces are left at both ends of the through holes 23A and 23B. In this embodiment, the lengths of the magnetic pieces 25A and 25B inserted into the through holes 23A and 23B, respectively, are decreasing toward the upper end of the magnetic pole surface 19a. More specifically, the magnetic piece 25B inserted into the through holes 23B near the upper end of the magnetic pole surface 19a is shorter than the magnetic piece 25A inserted into the through holes 23A far from the upper end of the magnetic pole surface 19a.

Next, various linear motors according to this embodiment having the same structure except for the ratio of $R/\tau p$ were fabricated. As described above, R indicates the radius of the arc of the curved surface 19b, and $\tau p$ indicates the pitch between the centers of the permanent magnets 7A and 7B. Then, the relationship among the ratio $R/\tau p$, a cogging force ratio, and an armature total length ratio was studied, provided that the cogging force is set to 100 and the armature total length is set to 100 when the ratio $R/\tau p$ is 0.5. Table 1 indicates the results of the study.

TABLE 1

| R/τp | Cogging Force Ratio | Armature Total Length Ratio |
| --- | --- | --- |
| 0.5 | 100 | 100 |
| 0.6 | 50 | 101 |
| 0.8 | 25 | 102 |
| 1 | 16 | 104 |
| 1.2 | 11 | 105 |

TABLE 1-continued

| R/τp | Cogging Force Ratio | Armature Total Length Ratio |
| --- | --- | --- |
| 1.5 | 6 | 106 |
| 2 | 4 | 109 |
| 2.5 | 6 | 111 |
| 3 | 13 | 112 |
| 3.5 | 21 | 114 |
| 4 | 30 | 116 |

From Table 1, it can be seen that when the ratio $R/\tau p$ becomes less than 1, the cogging force cannot be reduced, and a variation in the cogging force becomes larger. Further, it can be seen that when the ratio $R/\tau p$ exceeds 3.5, the total length of the armature increases.

Next, various linear motors according to this embodiment having the same structure except for the ratio of Lt/R were fabricated. As described above, Lt indicates the length between the lower and upper ends of the curved surface 19b in the direction in which the yoke extends, while R indicates the radius of the arc. Then, the relationship among the ratio Lt/R, the cogging force ratio, and the armature total length ratio was studied, provided that the cogging force is set to 100 and the armature total length is set to 100 when the ratio Lt/R is 0.30. Table 2 indicates the results of the study.

TABLE 2

| Lt/R | Cogging Force Ratio | Armature Total Length Ratio |
| --- | --- | --- |
| 0.30 | 100 | 100 |
| 0.34 | 52 | 101 |
| 0.38 | 24 | 102 |
| 0.42 | 12 | 103 |
| 0.45 | 6 | 104 |
| 0.49 | 4 | 105 |
| 0.53 | 8 | 107 |
| 0.57 | 13 | 108 |
| 0.61 | 18 | 109 |
| 0.65 | 22 | 110 |
| 0.69 | 27 | 111 |
| 0.72 | 31 | 112 |
| 0.76 | 34 | 113 |
| 0.80 | 37 | 114 |

From Table 2, it can be seen that when the ratio Lt/R becomes below 0.38, the cogging force cannot be reduced. It can also be seen that when the ratio Lt/R exceeds 0.65, the cogging force increases and the total length of the armature also increases.

Next, various linear motors according to this embodiment having the same structure except for the angle $\alpha°$ were fabricated. As described above, the angle $\alpha°$ indicates the angle between the virtual line L1 that extends in parallel to the magnetic pole row 7 and the tangent L3 that passes through the lower end of the curved surface 19b. Then, the relationship between the angle $\alpha°$ and the cogging force ratio was studied, provided that the cogging force is set to 100 when the angle $\alpha°$ is 0. Table 3 shows the results of the study.

TABLE 3

| α° | Cogging Force Ratio |
| --- | --- |
| 0 | 100 |
| 4 | 176 |
| 7 | 314 |
| 10 | 516 |

TABLE 3-continued

| α° | Cogging Force Ratio |
|---|---|
| 15 | 1098 |
| 20 | 1961 |
| 25 | 2967 |
| 30 | 4144 |

From Table 3, it can be seen that when the angle α° exceeds 10°, the cogging force cannot be reduced, and a variation in the cogging force becomes larger.

Figure 3:
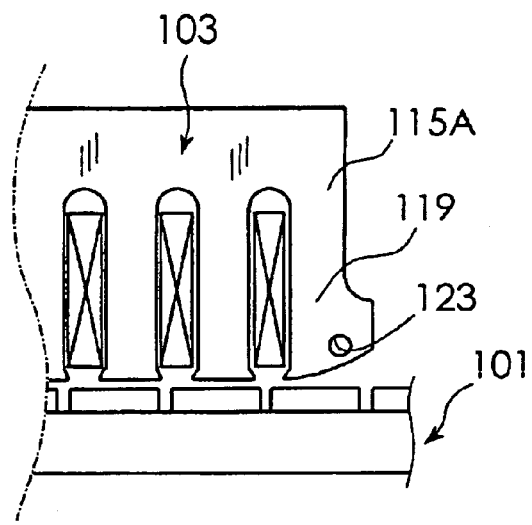
FIG. 3 is a schematic diagram used to explain the construction of a linear motor according to a second embodiment of the present invention.
Figure 4:
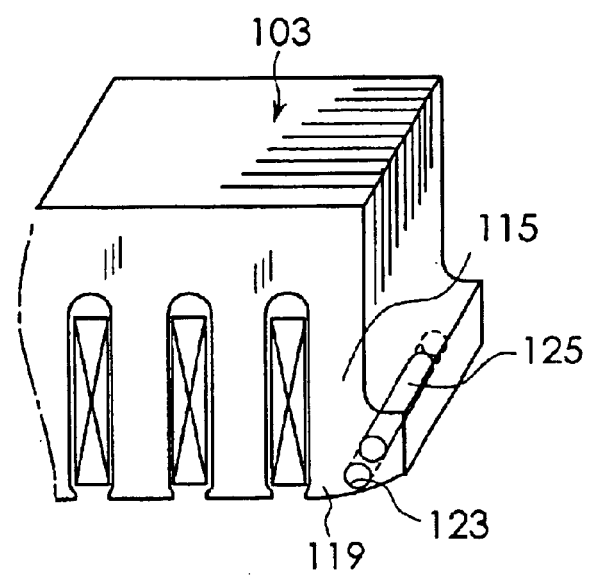
FIG. 4 is a partial perspective view of a movable element used in the linear motor shown in FIG. 3.

In this embodiment, the two through holes 23A and 23B are formed in the magnetic pole surface constituent section 19, and the two magnetic pieces 25A and 25B are arranged inside the two through holes 23A and 23B, respectively. The number of the through holes and the number of the magnetic pieces arranged inside the through holes are arbitrary. Only one through hole 123 may be formed in the magnetic pole surface constituent 119 as shown in FIG. 3, for example. One magnetic piece 125 is arranged inside the through hole 123, as shown in FIG. 4.

The magnetic pieces need not necessarily be arranged inside the through holes. Only the through holes may be formed in the magnetic surface constituent.

In the embodiment described above, the through holes with a circular cross sectional shape were formed as the holes or cavities. The shape of the holes or cavities formed in the magnetic pole surface constituent, however, is arbitrary.

In the embodiment mentioned above, the stator includes the magnetic pole row, and the movable element includes the armature. In other embodiments of the present invention, the stator may have an armature and the movable element may have a magnetic pole row.

Further, the present invention is not limited to these embodiments, but variations and modifications may be made without departing from the scope of the present invention.

What is claimed is:

1. A linear motor which has a stator and a movable element constructed to reciprocate linearly relative to said stator comprising:

one or more magnetic pole rows provided at one of said stator and said movable element and constituted by juxtaposedly arranging a plurality of permanent magnets, and an armature provided at the other of said stator and said movable element and including:

a core formed by lamination of a plurality of electromagnetic steel plates, and having a yoke extending linearly in a direction orthogonal to a laminating direction in which said electromagnetic steel plates are laminated, and a plurality of pole teeth protruding from said yoke toward said magnetic pole row side and having magnetic pole surfaces opposed to said magnetic pole row at ends thereof; and multi-phase exciting windings for exciting said plurality of the pole teeth;

wherein each of said magnetic pole surfaces of two pole teeth located at both ends of a pole tooth row constituted by said plurality of the pole teeth comprises a curved surface curved such that a gap between said magnetic pole row and said curved surface increases with increasing distance from other pole teeth adjacent thereto; and wherein said curved surface is formed so as to satisfy a relationship of $0.38 \leq Lt/R \leq 0.65$, in which R is said radius of said arc, and Lt is a length between a lower end of said curved surface, and an intersection of a virtual line passing through said lower end of said curved surface and extending in parallel to said magnetic pole row and a virtual perpendicular passing through an upper end of said curved surface and orthogonally crossing said virtual line; and wherein a contour of said curved surface, as seen from one side of said laminating direction of said electromagnetic steel plates, has a shape of an arc and the radius of said arc is defined so as to satisfy a relationship of $1 \leq R/Tp \leq 3.5$, in which Tp is a pitch between centers of two adjacent magnets of said permanent magnets in said magnetic pole row; and wherein an angle α between a virtual line extending in parallel to said magnetic pole row and a tangent line passing through said lower end of said curved surface is 0°.

2. A linear motor which has a stator and a movable element constructed to reciprocate linearly relative to said stator comprising:

one or more magnetic pole rows provided at one of said stator and said movable element and constituted by juxtaposedly arranging a plurality of permanent magnets, and an armature provided at the other of said stator and said movable element and including:

a core formed by lamination of a plurality of electromagnetic steel plates, and having a yoke extending linearly in a direction orthogonal to a laminating direction in which said electromagnetic steel plates are laminated, and a plurality of pole teeth protruding from said yoke toward said magnetic pole row side and having magnetic pole surfaces opposed to said magnetic pole row at ends thereof; and multi-phase exciting windings for exciting said plurality of the pole teeth;

wherein each of said magnetic pole surfaces of two pole teeth located at both ends of a pole tooth row constituted by said plurality of the pole teeth comprises a curved surface curved such that a gap between said magnetic pole row and said curved surface increases with increasing distance from other pole teeth adjacent thereto; and wherein in a vicinity of said each of the magnetic pole surfaces of the two pole teeth located at said both ends of said pole tooth row, one or more holes or cavities extending in said laminating direction of said electromagnetic steel plates are formed.

3. A linear motor which has a stator and a movable element constructed to reciprocate linearly relative to said stator comprising:

one or more magnetic pole rows provided at one of said stator and said movable element and constituted by juxtaposedly arranging a plurality of permanent magnets, and an armature provided at the other of said stator and said movable element and including:

a core formed by lamination of a plurality of electromagnetic steel plates, and having a yoke extending linearly in a direction orthogonal to a laminating direction in which said electromagnetic steel plates are laminated, and a plurality of pole teeth protruding from said yoke toward said magnetic pole row side and having magnetic pole surfaces opposed to said magnetic pole row at ends thereof; and multi-phase exciting windings for exciting said plurality of the pole teeth;

wherein each of said magnetic pole surfaces of two pole teeth located at both ends of a pole tooth row constituted by said plurality of the pole teeth comprises a curved surface curved such that a gap between said magnetic pole row and said curved surface increases with increasing distance from other pole teeth adjacent thereto; and wherein in a vicinity of said each of the magnetic pole surfaces of the two pole teeth located at said both ends of said pole tooth row, one or more holes or cavities extending in said laminating direction of said electromagnetic steel plates are formed, and wherein a magnetic piece is arranged inside said one or more holes or cavities so that spaces are left at both ends of said one or more holes or cavities, said magnetic piece having a length shorter than a thickness of said electromagnetic steel plates in said laminating direction of said electromagnetic steel plates.

4. A linear motor which has a stator and a movable element constructed to reciprocate linearly relative to said stator comprising:

one or more magnetic pole rows provided at one of said stator and said movable element and constituted by juxtaposedly arranging a plurality of permanent magnets, and an armature provided at the other of said stator and said movable element and including:

a core formed by lamination of a plurality of electromagnetic steel plates, and having a yoke extending linearly in a direction orthogonal to a laminating direction in which said electromagnetic steel plates are laminated, and a plurality of pole teeth protruding from said yoke toward said magnetic pole row side and having magnetic pole surfaces opposed to said magnetic pole row at ends thereof; and multi-phase exciting windings for exciting said plurality of the pole teeth;

wherein each of said magnetic pole surfaces of two pole teeth located at both ends of a pole tooth row constituted by said plurality of the pole teeth comprises a curved surface curved such that gap between said magnetic pole row and said curved surface increases with increasing distance from other pole teeth adjacent thereto; and wherein in a vicinity of said each of the magnetic pole surfaces of the two pole teeth located at said both ends of said pole tooth row, one or more holes or cavities extending in said laminating direction of said electromagnetic steel plates are formed, wherein a magnetic piece is arranged inside said one or more holes or cavities so that spaces are left at both ends of said one or more holes or cavities, said magnetic piece having a length shorter than a thickness of said electromagnetic steel plates in said laminating direction of said electromagnetic steel plates, and wherein said holes and cavities are formed so as to be juxtaposedly arranged along said magnetic pole surfaces, and lengths of magnetic pieces inserted into said holes or cavities decrease with increasing distance from said magnetic pole row.

5. A linear motor which has a stator and a movable element constructed to reciprocate linearly relative to said stator comprising:

a magnetic pole row provided at one of said stator and said movable element and constituted by arranging a plurality of N-pole permanent magnets and a plurality of S-pole permanent magnets alternately on a base; and an armature provided at the other of said stator and said movable element and including:

a core formed by lamination of a plurality of electromagnetic steel plates, and having a yoke extending linearly in a direction orthogonal to a laminating direction in which said electromagnetic steel plates are laminated, and a plurality of pole teeth protruding from said yoke toward said magnetic pole row side and having magnetic pole surfaces opposed to said magnetic pole row at ends thereof; and multi-phase exciting windings for exciting said plurality of the pole teeth, part of said exciting windings being arranged in slots formed between adjacent pairs of said plurality of the pole teeth;

wherein each of said magnetic pole surfaces of the two magnetic pole teeth located at both ends of a pole tooth row constituted by said plurality of the pole teeth comprises a curved surface that is curved such that a gap between said magnetic pole row and the curved surface increases with increasing distance from other pole teeth adjacent thereto; and a contour of said curved surface, as seen from one side of said laminating direction of said electromagnetic steel plates, has a shape of an arc and the radius of said arc is defined so as to satisfy a relationship of $1 \leq R/T p \leq 3.5$, in which R is said radius of said arc, and Tp is a pitch between centers of two adjacent magnets of said permanent magnets in said magnetic pole row.

* * * * *

UNITED STATES PATENT AND TRADEMARK OFFICE
CERTIFICATE OF CORRECTION

PATENT NO. : 6,949,846 B2
DATED : September 27, 2005
INVENTOR(S) : Sugita et al.

It is certified that error appears in the above-identified patent and that said Letters Patent is hereby corrected as shown below:

Column 9,
Line 42, after "that", insert -- a --.

Signed and Sealed this

Twenty-second Day of November, 2005

JON W. DUDAS
*Director of the United States Patent and Trademark Office*